United States Patent [19]

Yasuda et al.

[11] Patent Number: 5,343,188
[45] Date of Patent: Aug. 30, 1994

[54] SLIDE RHEOSTAT TYPE LINEAR CHARACTERISTIC SENSOR

[75] Inventors: Keiji Yasuda, Kariya; Yukihisa Oda, Chiryu; Satoru Tagawa, Takahama; Masahiro Kimura, Kariya, all of Japan

[73] Assignee: Aisin Seiki Kabushiki Kaisha, Kariya, Japan

[21] Appl. No.: 35,180

[22] Filed: Mar. 22, 1993

[30] Foreign Application Priority Data

Mar. 27, 1992 [JP] Japan .................. 4-071183

[51] Int. Cl.⁵ .......................................... H01C 10/16
[52] U.S. Cl. ................................. 338/129; 338/167; 338/171
[58] Field of Search ............... 338/172, 129, 164, 160, 338/162

[56] References Cited

U.S. PATENT DOCUMENTS

| | | | |
|---|---|---|---|
| 1,604,196 | 10/1926 | Potter | 338/129 |
| 4,139,817 | 2/1979 | Boer et al. | 338/229 X |
| 5,113,172 | 5/1992 | Lang | 338/171 |

FOREIGN PATENT DOCUMENTS 3281947 12/1991 Japan .
3281957 12/1991 Japan .

*Primary Examiner*—Marvin M. Lateef
*Attorney, Agent, or Firm*—Sughrue, Mion, Zinn, Macpeak & Seas

[57] ABSTRACT

A slide rheostat type linear characteristic sensor includes a detecting resistor R2 printed on a substrate 8. A brush 7 slides on the detecting resistor R2. Clamping resistors R1 and R3 are printed, simultaneously with the detecting resistor, on the substrate 8 at positions separate from a sliding area of the brush 7. The clamping resistors R1 and R3 are made of the same material as the detecting resistor R2.

8 Claims, 8 Drawing Sheets

SLIDE RHEOSTAT TYPE LINEAR CHARACTERISTIC SENSOR

BACKGROUND OF THE INVENTION

1. Field of the Invention

This invention relates to a slide rheostat type linear characteristic sensor that has a substrate and a resistor formed thereon and contacted with a brush. It relates particularly to a slide rheostat type linear characteristic sensor which is applicable to a potentiometer, a throttle position sensor, an encoder and the like.

2. Description of the Related Art

FIG. 8 is a front view showing main parts of a conventional slide rheostat type linear characteristic sensor.

As illustrated in FIG. 8, the prior art sensor has a circuit board composed of a substrate 31 and a fixed resistivity of resistor 32 formed on the substrate 31 by sintering. A conductor brush 33 is so arranged that it touches the resistor 32 at a predetermined contact pressure and slides thereon. A terminal 35 and a terminal 36 are provided on opposite ends of the resistor 32. The terminals 35 and 36 are electrode terminals that apply a prescribed voltage to the resistor 32. The brush 33 conducts a contact potential relative to the resistor 32 to the terminal 37, from the voltage applied between the terminals 35 and 36 via a fixed conductor 34. The contact potential of the brush 33 is outputted from a terminal 37. A not shown harness is connected with the terminals 35, 36 and 37. Thus, the contact potential is varied linearly according to a contact position of the brush 33 and the resistor 32.

In recent years, such sensor was widely used for a variety of detecting systems such as a G sensor and a height sensor. There is a request for such measures as generating a clamping current in order to distinguish a normal state from an abnormal state like a breaking of the harness and a short-circuit.

However, the above mentioned sensor has no clear or definite clamping resistance even if used as the throttle position sensor. Therefore, there is a possibility that the throttle position sensor sometimes outputs a zero volt, or Vcc (supply voltage) even when it is used normally. As such throttle position sensor possibly outputs the zero volt or Vcc even in case of breaking of the sensor (Vcc) or a short circuit of the sensor (0V), a computer cannot judge whether the sensor is in order or out of order. As a result, there is a fear that a fail-safe does not work properly.

There may be an idea that a clamping resistor is assembled as a separate member so as to output a clamping voltage. In this case, there is a fear that costs for such parts will substantially increase production costs. Another problem is that, if the clamping resistor is disposed merely on another place than a place of a detecting resistor, an accurate detection is impossible due to influences of an atmosphere temperature where the sensor is positioned. In case the clamping resistor is connected to the detection resistor to be one successive resistor, an adjusting device is necessary in attaching the sensor in order to lessen an output voltage change due to assembling errors, thereby increasing costs.

SUMMARY OF THE INVENTION

In view of the above, it is an object of the invention to provide a slide rheostat type linear characteristic sensors that is free from influences due to atmospheric temperature of surroundings, resistant to influences due to errors in mounting or operating the sensor, and capable of obtaining a stable output voltage with low costs.

In accordance with one preferred mode of the invention, there is provided a slide rheostat type linear characteristic sensor that has a brush slidable on a detecting resistor disposed on a substrate. A clamping resistor is disposed on the same substrate as the detecting resistor. The clamping resistor is made of the same material as the detecting resistor and arranged at a separate position from a sliding area of the brush.

Further objects and advantages of the invention will be apparent from the following description, reference being had to the accompanying drawings, wherein preferred embodiments of the invention are clearly shown.

DETAILED DESCRIPTION OF THE PREFERRED EMBODIMENTS

Figure 1:
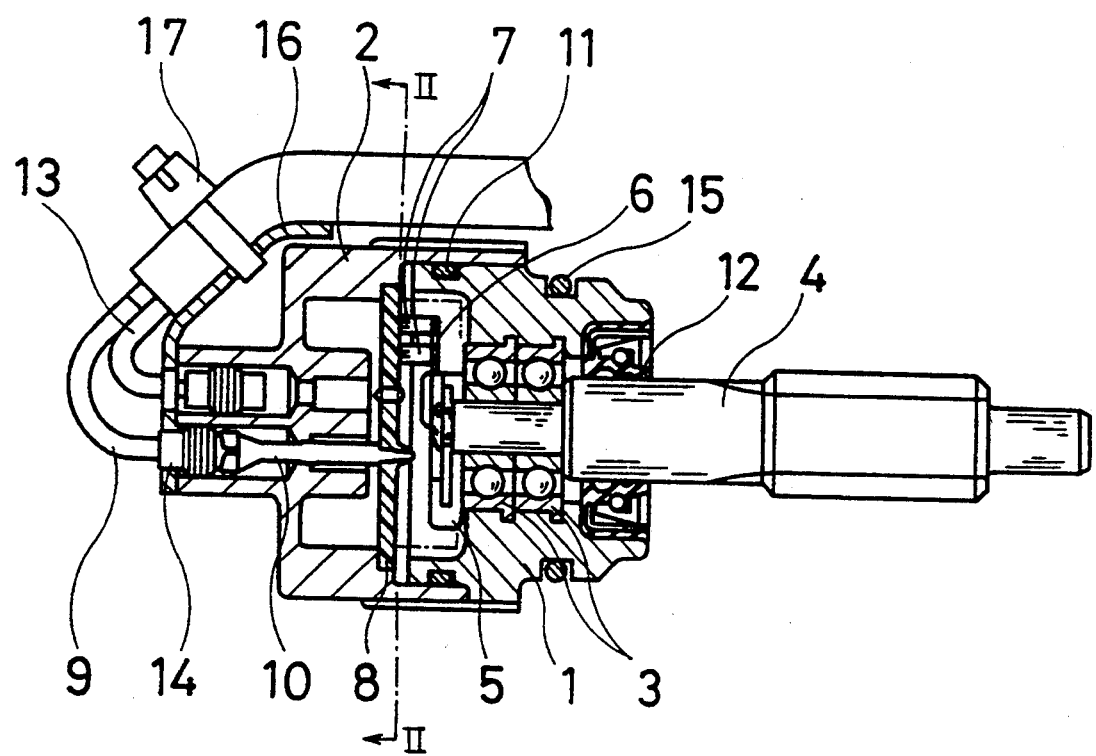
FIG. 1 is a cross section showing one embodiment of a slide rheostat linear characteristic sensor of the invention.

Referring to the drawings, wherein like reference characters designate like or corresponding parts throughout the several views, a preferred mode of a slide rheostat type linear characteristic sensor of the invention will be described hereafter.

Figure 2:
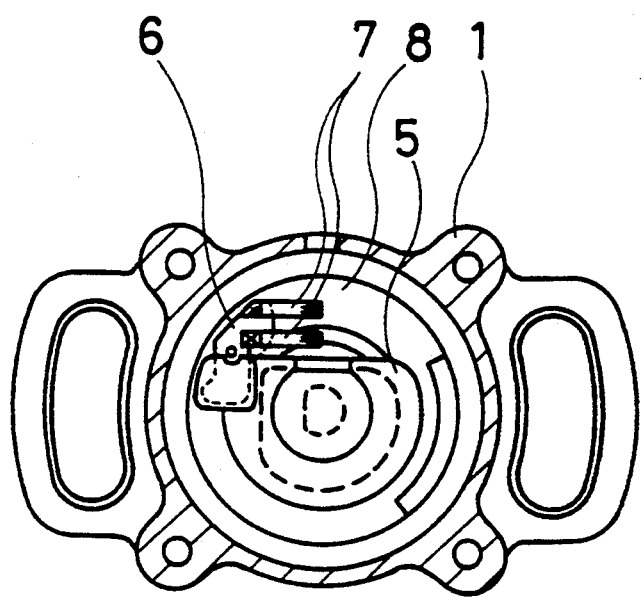
FIG. 2 is a longitudinal section showing a slide rheostat type linear characteristic sensor taken along the line II—II of FIG. 1.
Figure 3:
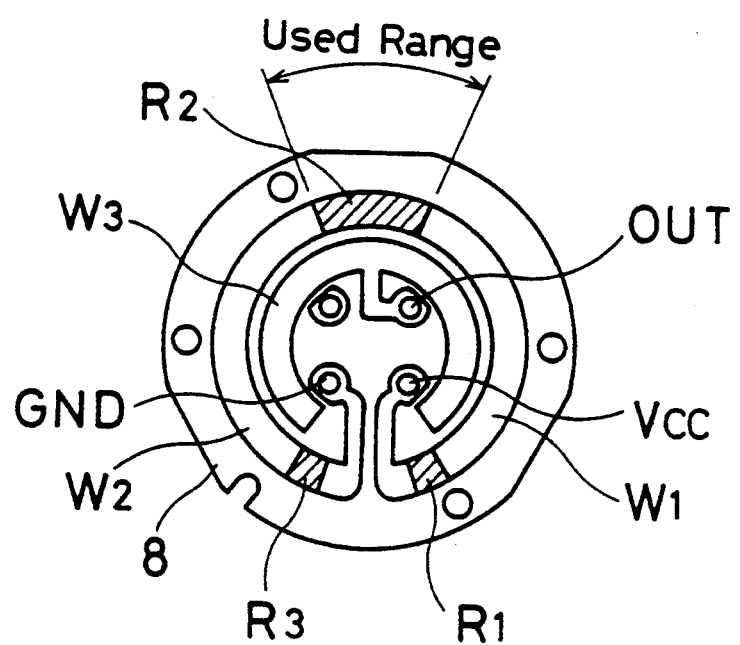
FIG. 3 is a front view showing resistors of one embodiment of a slide rheostat type linear characteristic sensor of the invention.
Figure 4A:
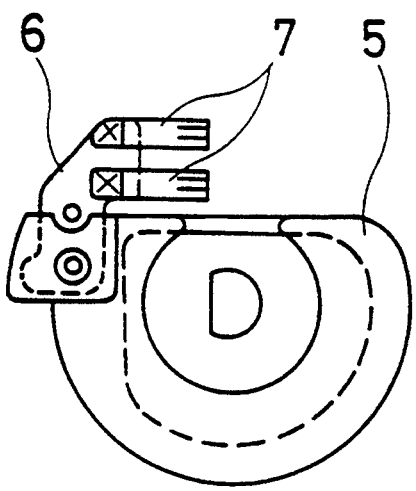
FIG. 4(a) is a front view showing brushes of one embodiment of a slide rheostat type linear characteristic sensor of the invention.
Figure 4B:
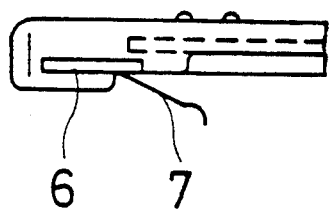
FIG. 4(b) is a side view showing a sliding portion of one embodiment of a slide rheostat type linear characteristic sensor of the invention.
Figure 5:
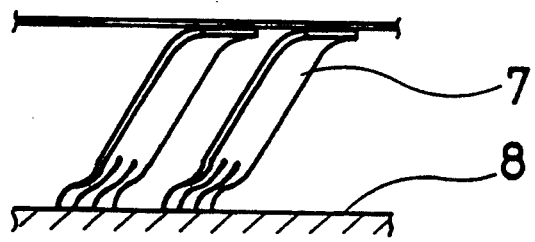
FIG. 5 is an enlarged side view showing brushes of one embodiment of a slide rheostat type linear characteristic sensor of the invention.

FIG. 1 illustrates a cross section of the embodiment of the sensor. FIG. 2 illustrates a longitudinal section of the sensor taken along the line II—II. FIG. 3 shows a front view of resistors of the sensor. FIG. 4(a) shows a front view of brushes of the sensor. FIG. 4(b) illustrates a side view of a sliding portion of the sensor. FIG. 5 illustrates an enlarged side view of brushes of the sensor.

Referring to FIG. 1, the present embodiment of the sensor has an outer hull composed of a housing 1 and a case 2. Bearings 3 are secured in the housing 1, e.g. by inserting them at a time of synthetic resin molding. A shaft 4 is rotatably supported by the bearings 3. As shown in FIG. 2, a holder 5 is fixed on one end of the shaft 4 by swaging or the like. A metal plate 6 of a stainless steel (SUS) or the like is fixed on the holder 5, e.g. by inserting it in molding the holder 5. As shown in FIG. 4, two brushes 7 are secured to the metal plate 6 by spot welding. An insulating substrate 8 is fixed on the case 2 by ultrasonic welding or the like. A wire harness 9 is electrically connected with a terminal 10. The terminal 10 is soldered to the substrate 8.

An O-ring 11 is fitted between the housing 1 and the case 2 for the purpose of blocking water and dust. An oil seal 12 is fitted between the shaft 4 and the housing 1 for the same purpose. Rubber plugs 14 are put between the case 2 and a breather tube 13 and between the case 2 and the wire harness 9, respectively, for the same object. An O-ring 15 is fitted on an outside of the housing 1 for making it watertight and dusttight between the sensor itself and a mounting portion (not shown) for the sensor. A fixing plate 16 of a metal plate is attached immovably to the case by screws or the like. The wire harness 9 is bound on the fixing plate 16 by a bundling band 17. The breather tube 13 communicates an interior Of the sensor and a waterproof place, e.g. a cabin space of a car, so as to balance pressures between the interior and an exterior of the sensor. Thus, the tube 13 prevents water absorption due to pressure difference between the interior and the exterior of the sensor when an atmosphere temperature surrounding it changes.

As shown in FIG. 3, pasty clamping resistors R1 and R3 and detecting resistor R2 are printed respectively on the substrate 8. Patterned conductors W1 and W2 connect the clamping resistor R1 and the detecting resistor R2 as well as the detecting resistor R2 and the clamping resistor R3. The conductor W1, W2 is so constructed that it does not change voltage at any positions thereof. A resistivity Of the conductor W1, W2 is enough smaller than that of the clamping resistor R1, R3 and the detecting resistor R2. The brush 7 slides on the detecting resistor R2, but does not reach and slide on the clamping resistors R1 and R3. A patterned conductor W3 of the same construction of the conductor W1, W2 is arranged inside the detecting resistor R2 and the conductors W1 and W2.

An operation of the above structured sensor will be described hereafter.

Figure 6:
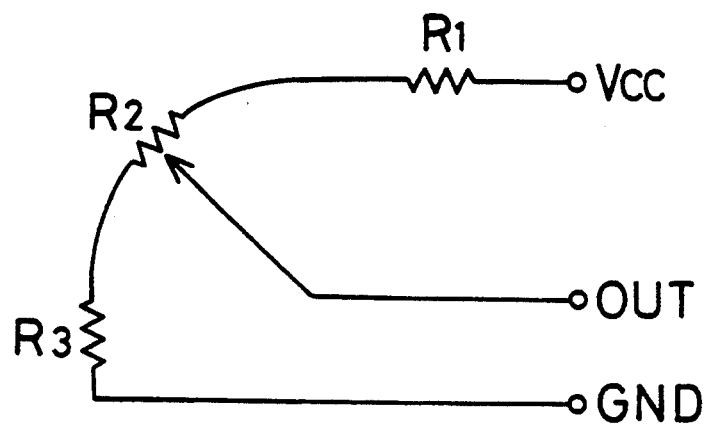
FIG. 6 is a circuit diagram showing a principle of one embodiment of a slide rheostat type linear characteristic sensor of the invention.

When the shaft 4 is rotated, the holder 5 is revolved integrally therewith. Thus, the brushes 7 slide on the substrate 8 with the rotation of the shaft 4. At this time, one of the two brushes 7 has its leading end sliding on the detecting resistor R2, while the other brush 7 has its leading end sliding on the conductor W3. A circuit of the sensor itself is as shown in FIG. 6, since the two brushes 7 are electrically connected each other by the metal plate 6. FIG. 6 illustrates a circuit diagram of a principle of the sensor.

A fixed voltage, e.g. 5 volts, is applied to the sensor through the wire harness 9. Namely, the voltage of 5 volts is applied between a power terminal Vcc and a ground terminal GND. On this condition, when the shaft 4 is rotated and the brush 7 is moved, the voltage applied between the Vcc terminal and the GND terminal is divided. The divided voltage can be detected as an electric potential of an OUT terminal that is a voltage between the OUT terminal and the GND terminal. Thus, it is possible to obtain the degree of rotation of the shaft 4 by a change of the voltage between the OUT terminal and the GND terminal.

Figure 7:
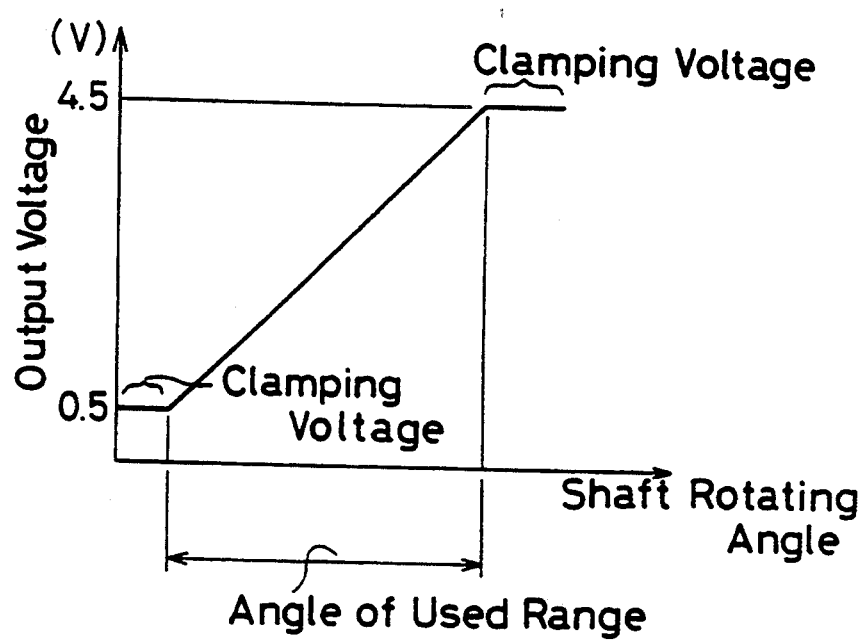
FIG. 7 is a graph showing a relation between an output voltage and a shaft rotating angle in one embodiment of a slide rheostat type linear characteristic sensor of the invention.
Figure 8:
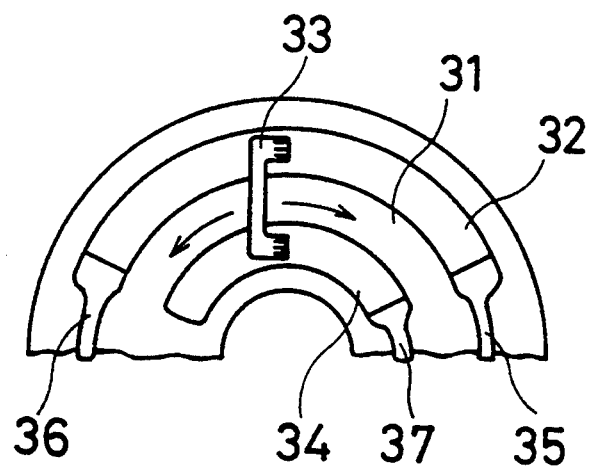
FIG. 8 is an enlarged front view showing a conventional linear rheostat type linear characteristic sensor.

The brush 7 does not touch the clamping resistors R1 and R3 but slides on the detecting resistor R2, though the clamping resistors R1 and R3 are disposed on the substrate 8, in this sensor. Thus, a relation between an output voltage and a rotating angle of the shaft 4 is as shown in FIG. 7. FIG. 7 is a graph showing the relation between the output voltage and the shaft rotating angle in the present embodiment of the sensor.

If the clamping resistors R1 and R3 are not provided, the output voltage of the sensor changes between zero volt and five volts. Accordingly, when the output voltage of the sensor is 0 volt or 5 volts, a computer cannot judge whether the output voltage is an output voltage at a normal condition or an output voltage at an abnormal condition such as a case in which the OUT terminal and the GND terminal is short-circuited (0V) or a case in which a connector is out of joint or broken to open the circuit (5V).

However, the present embodiment of the sensor has the clamping resistors R1 and R3 arranged at both sides of the detecting resistor R2. Thus, as shown in FIG. 7, such clamping portions show constant output voltages respectively at an upper limit and a lower limit of the output voltage regardless of the rotating angle of the shaft 4, when the shaft is rotated beyond a predetermined angle. Thereby, if the sensor is out of order, the output voltage is 0V or 5V. Namely, when the output voltage of the sensor is 0V or 5V, the computer can judge that the sensor is disordered.

The present embodiment provides clamping portions by adopting a structure that the clamping resistors R1 and R3 are printed on the substrate 8 at other places than that of the detecting resistor R2, namely at separate positions from a sliding area of the brush 7. Thus, the brush 7 slides on the detecting resistor R2, but does not touch the clamping resistors R1 and R3, so that a stable output voltage characteristic can be obtained without influences of mounting errors of the sensor or the like. As a result, it is possible to distinguish an abnormal state like a short circuit or breaking of the sensor by the computer, thereby making it easy to work a fail-safe or the like of the computer in case the sensor is out of order. Specially, the clamping resistors R1 and R3 are disposed separately enough from the detecting resistor R1 which is positioned at a center of a working angle. Therefore, if errors arise in mounting or differences in the working angle of the sensor, the brush 7 is never contacted with the clamping resistors R1 and R3. Thus, it is possible to obtain a stable output voltage.

The clamping resistors R1 and R3 are printed on the substrate 8 using the same material as the detecting resistor R2. Thus, the clamping resistors R1 and R3 and the detecting resistor R2 have the same temperature characteristic and the like, so that the sensor has a stable output voltage characteristic regardless of a change of the atmosphere temperature. Moreover, the clamping resistors R1 end R3 are printed at the same time with the detecting resistor R2. Therefore, costs for parts decrease thereby lessening production costs in comparison with a case in which special clamping resistors R1 and R3 are formed individually and assembled independently.

As mentioned above, the present embodiment of the sensor has the brushes 7 and the detecting resistor R2 which is disposed on the insulator substrate 8 by printing so that the brush 7 is slidingly contacted with the resistor R2. The sensor further has the clamping resistors R1 and R3 which are arranged at separate positions from the moving range of the brush 7 on the same substrate 8 by simultaneous printing with the detecting resistor R2 and made of the same material as the detecting resistor R2.

Namely, the present embodiment of the sensor prints the clamping resistors R1 and R3 at the separate positions from the sliding range of the brush 7 simultaneously with the detecting resistor R2 on the same substrate 8 using the same material, in addition to the detecting resistor R2 on which the brush 7 slides.

Accordingly, the output voltage is not zero volt nor an applied supply voltage due to the clamping voltage of the clamping resistors R1 and R3, in case the sensor operates normally. Thus, it is possible to clearly distinguish trouble of the sensor such as the breaking or short circuit in case the output voltage of the sensor becomes zero volt or the supply voltage. Moreover, the detecting resistor R2 and the clamping resistors R1 and R3 are printed on the same substrate 8 using the same material, so that they have the same temperature characteristic on the same condition and the same environment and are not affected by the atmosphere temperature. Since the detecting resistor R2 and the clamping resistors R1 and R3 are not continuous and the brush 7 is not contacted directly with the clamping resistors R1 and R3, there is a little change in the output voltage in case of mounting errors or operating errors, of the sensor. As a result, it is possible to get a stable output voltage characteristic of high reliability with very low costs.

This invention may be practiced or embodied in still other ways without departing from the spirit and essential character thereof. For instance, while the slide rheostat type linear characteristic sensor utilized as the throttle position sensor in the illustrated preferred embodiment in order to detect the rotating angle of the shaft 4 from the output voltage of the sensor, the slide rheostat type linear characteristic sensor may alternately be applied to other detections as a matter of course.

The preferred embodiments described herein are therefore illustrative and not restrictive, the scope of the invention being indicated in the appended claims and all variations which come within the meaning of the claims are intended to be embraced therein.

What is claimed is:

1. A slide rheostat type linear characteristic sensor, comprising:
   a brush mounted for movement along a fixed moving locus;
   an insulator substrate disposed opposite to the brush;
   a detecting resistor disposed on the substrate so that the brush slides on the detecting resistor within a range of the moving locus; and
   at least one clamping resistor disposed at a position separate from the moving locus of the brush on the substrate, the clamping resistor being made of a same material as the detecting resistor and having one end electrically connected with one end of the detecting resistor while having another end supplied with a source voltage or grounded, whereby the clamping resistor supplies a clamping voltage, at the one end, which is lower than the source voltage or higher than a ground voltage, without contact with the brush.

2. A slide rheostat type linear characteristic sensor according to claim 1, wherein the detecting resistor and the clamping resistor are electrically connected by a patterned conductor, the patterned conductor generating a same voltage at any positions thereof.

3. A slide rheostat type linear characteristic sensor according to claim 2, which comprises a pair of clamping resistors, and in which the detecting resistor and the clamping resistors are electrically connected by a pair of patterned conductors generating a same voltage at any positions thereof.

4. A slide rheostat type linear characteristic sensor according to claim 3, wherein the detecting resistor is formed in a predetermined angle of an arc, the patterned conductors are extended in a pair at opposite ends of the detecting resistor so as to form arcs respectively continuous to the arc of the detecting resistor, and the clamping resistors are connected in a pair with free ends of the patterned conductors respectively.

5. A slide rheostat type linear characteristic sensor according to claim 4, wherein the detecting resistor and the clamping resistors are printed simultaneously on one surface of the substrate using the same material.

6. A slide rheostat type linear characteristic sensor, comprising:
   an outer hull having a cavity thereinside;
   a shaft fitted rotatably in the outer hull;
   a brush connected to one end of the shaft so as to rotate integrally with the shaft, the brush being rotated within a range of a predetermined angle;
   an insulator substrate fixed in the outer hull so as to have one surface faced with the brush;
   a detecting resistor of an arc shape of a predetermined angle, the detecting resistor being provided on the one surface of the substrate within a range of a rotating locus of the brush;
   a pair of clamping resistors provided on the one surface of the substrate except the range of the rotating locus of the brush, the clamping resistors being disposed separately from the detecting resistor; and
   patterned conductors having arc shaped respectively continuous to the detecting resistor so as to electrically connect one end of each of the clamping resistors respectively to opposite ends of the detecting resistor, the patterned conductors having a same voltage at any positions thereof;
   one of the clamping resistors having another end supplied with a source voltage and another of the clamping resistors having another end grounded whereby the one clamping resistor supplies a clamping voltage which is lower than the source voltage and the other clamping resistor supplies a clamping voltage which is higher than a ground voltage.

7. A slide rheostat type linear characteristic sensor according to claim 6, further comprising a breather means communicating an interior space of the outer hull and a water-proof space positioned outside of the outer hull.

8. A slide rheostat type linear characteristic sensor, comprising:
   a brush;
   an insulator substrate disposed opposite to the brush;
   a detecting resistor disposed on a substrate so that the brush slides on the detecting resistor along a moving locus; and
   a clamping resistor disposed at a position separate from a sliding range of the brush on the substrate, the clamping resistor being made of a same material as the detecting resistor and having one end electrically connected with one end of the detecting resistor while having another end supplied with a source voltage or grounded, whereby the clamping resistor supplies a clamping voltage at the one end, which is lower than a ground voltage, without contact with the brush.

* * * * *